United States Patent
Ogawa

(10) Patent No.: US 7,361,243 B2
(45) Date of Patent: Apr. 22, 2008

(54) TIRE MANUFACTURING METHOD AND GREEN TIRE MANUFACTURING APPARATUS

(75) Inventor: Yuuichirou Ogawa, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 122 days.

(21) Appl. No.: 10/518,011

(22) PCT Filed: Jun. 16, 2003

(86) PCT No.: PCT/JP03/07608

§ 371 (c)(1),
(2), (4) Date: Dec. 14, 2004

(87) PCT Pub. No.: WO03/106151

PCT Pub. Date: Dec. 24, 2003

(65) Prior Publication Data

US 2005/0211366 A1    Sep. 29, 2005

(30) Foreign Application Priority Data

Jun. 16, 2003 (JP) .............................. 2002-173596

(51) Int. Cl.
*B29D 30/16* (2006.01)
*B29D 30/18* (2006.01)

(52) U.S. Cl. ...................... 156/117; 156/132; 156/401; 156/402; 156/414

(58) Field of Classification Search ................ 156/132, 156/400–402, 117, 397, 133
See application file for complete search history.

(56) References Cited

U.S. PATENT DOCUMENTS

| | | | | |
|---|---|---|---|---|
| 2,951,526 A | * | 9/1960 | Haase | 156/401 |
| 3,032,093 A | | 5/1962 | Nebout | |
| 3,051,220 A | * | 8/1962 | Ewing et al. | 156/398 |
| 3,223,566 A | * | 12/1965 | Walter et al. | 156/123 |
| 3,726,742 A | | 4/1973 | Harris | |
| 4,199,393 A | * | 4/1980 | Brown et al. | 156/401 |
| 4,484,973 A | * | 11/1984 | Kawaida et al. | 156/400 |
| 4,830,781 A | * | 5/1989 | Oswald | 152/530 |
| 2002/0011297 A1 | | 1/2002 | Caretta et al. | |

FOREIGN PATENT DOCUMENTS

| | | |
|---|---|---|
| DE | 11 59 163 B | 12/1963 |
| DE | 199 42 220 A1 | 3/2001 |
| EP | 0 102 316 A | 3/1984 |
| FR | 1 242 741 A | 8/1960 |
| JP | 47-18436 A | 5/1972 |
| JP | 2001-198989 A | 7/2001 |

OTHER PUBLICATIONS

Machine translation for FR 1,242,741.*

* cited by examiner

*Primary Examiner*—Geoffrey L. Knable
(74) *Attorney, Agent, or Firm*—Sughrue Mion, PLLC

(57) ABSTRACT

Using a core manufacturing method, a green tire is obtained in which edge portions of a carcass ply are turned up at bead cores.

An inner liner 40 is set on an external surface of a hard core 12, and a carcass 46 is formed thereon. A bladder 36 disposed inside the core is inflated, whereby edge portions of the carcass 46 can be turned up. Thereafter, conventionally known tire structural members such as a belt, a side tread and a top tread are set on, and a green tire is completed on the external surface of the hard core 12.

12 Claims, 14 Drawing Sheets

TIRE MANUFACTURING METHOD AND GREEN TIRE MANUFACTURING APPARATUS

BACKGROUND OF THE INVENTION

1. Field of the Invention

The present invention relates to a method of manufacturing a tire, and an apparatus for manufacturing a green tire. In particular, it relates to a method of manufacturing a tire whereby tire structural members such as a carcass, a bead core, a belt, and a tread are provided around a toroidal hard core to form a green tire, and the green tire is loaded in a mold, together with the hard core, and vulcanized to obtain a pneumatic tire; and to an apparatus for manufacturing a green tire applicable to the method of manufacturing a tire.

2. Description of the Related Art

There are two types of methods of forming a pneumatic tire: one of putting a green tire, formed in a tire-molding drum, into a mold, inflating it with a bladder, and vulcanizing the green tire; and the other of forming a green tire on an external surface of a metal hard core formed in a toroidal shape, putting the green tire in a mold with the hard core, and vulcanizing the green tire (a "core manufacturing method").

When a green tire is formed within a tire-molding drum, ordinarily, as shown in FIG. 14, edge portions of a carcass ply 100 are turned up from inside bead cores 102 to the outside thereof (a "turn-up structure").

In the core manufacturing method, tire structural members are set on an external surface of the hard core in the order of an inner liner, a carcass ply, and bead cores. As shown in FIG. 15, bead portions according to a conventional core manufacturing method are mainly of a type in which edge portions of the carcass ply 100 are sandwiched between two plate-shaped bead cores 104 and 106, which are formed in a toroidal shape. As shown in FIG. 16, there is also provided another type in which edge portions of the carcass ply 100 are bent toward the outside of bead cores 102 (a kind of a "turn-up structure").

However, among tires manufactured in accordance with conventional core manufacturing methods, no tire having bead portions with the kind of turn-up structure shown in FIG. 14 has been available on the commercial market. This is because facilities for literally "turning up" carcass plies have not been proposed as facilities for tire manufacturing according to the core manufacturing method.

Tires having bead portions of the types shown in FIGS. 15 and 16 have low general rigidity, and, in particular, low transverse rigidity. Further, a problem is caused in that tuning-up of a tire by turning up bead portions thereof cannot be conducted in the tires having bead portions of the types shown in FIGS. 15 and 16, which would be possible in the tire having bead portions of the types shown in FIG. 14.

The present invention has been devised in order to solve the aforementioned problems. Therefore, an object of the present invention is to provide, in accordance with the core manufacturing method, a method of manufacturing a tire in which edge portions of a carcass ply can be turned up at bead cores and an apparatus for manufacturing a green tire applicable to the method of manufacturing a tire.

DISCLOSURE OF THE INVENTION

One aspect of the invention is characterized by a method of manufacturing a tire in which a green tire is formed by providing a tire structural member, including bead cores, around a toroidal hard core, loaded in a mold, and vulcanized to obtain a pneumatic tire, the method comprising: a step of forming a carcass along an outer circumference of the hard core; and a step of turning up, around the bead cores, inner edge portions in a radial direction of the carcass formed on an outer surface of the hard core, by expanding outwardly in a radial direction expanding/contracting means inserted at an inner side in a radial direction of the bead cores and/or the hard core.

Next, the method of manufacturing a tire according to this aspect will be explained.

First, the carcass is formed at an external surface of the hard core and thereafter, bead cores or the like are positioned at side surfaces of the carcass.

Then, when the expanding/contracting means inserted at inner sides in a radial direction of the bead cores are expanded outwardly in a radial direction of the bead cores, the inner edge portions of the carcass positioned at inner sides in a radial direction of the bead cores are turned up around the bead cores.

Accordingly, bead portions having turn-up structure are obtained.

In this way, the tire manufacturing method of the present invention is advantageous in that use of the core manufacturing method facilitates manufacturing, in the core manufacturing method, of a pneumatic tire in which the edge portions of the carcass ply are turned up around the bead cores.

In another aspect of the invention, the method of manufacturing a tire is further characterized in that the step of forming the carcass comprises setting an unvulcanized rubber-coated cord on the hard core from one side surface portion to the other side surface portion of the hard core, turning the cord back at the other side surface, setting the cord on the hard core from the other side surface portion toward the one side surface portion and turning the cord back again, and setting the cord sequentially along a core circumferential direction.

Next, the tire manufacturing method according to this aspect will be described.

The carcass is formed on the entire external surface of the core by setting an unvulcanized rubber-coated cord on the hard core from one side surface portion to the other side surface portion of the hard core, turning the cord back at the other side surface, setting the cord on the hard core from the other side surface portion toward the one side surface portion and turning the cord back again, and setting the cord sequentially along a core circumferential direction.

Another aspect of the invention is an apparatus for manufacturing a green tire applicable to a method of manufacturing a tire in which a green tire formed by providing a tire structural member, including bead cores, around a toroidal hard core, is loaded in a mold and vulcanized to obtain a pneumatic tire, characterized in that the apparatus includes: expanding/contracting means which can be inserted at an inner side in a radial direction of the bead cores and/or the hard core, and which expand and/or contract in a radial direction; and moving means for moving the expanding/contracting means in an internal direction or an external direction with respect to the hard core.

Next, an operation of the apparatus for manufacturing a green tire according to this aspect will be explained.

When inner edge portions of the carcass formed on an external surface of the hard core are to be turned up around the bead cores, the expanding/contracting means are first set in a radially contracted state at an inner sides in a radial direction of the hard core, and then the carcass is formed on the external surface of the hard core.

When the bead cores are positioned at side surfaces of the carcass, the expanding/contracting means inserted at inner sides in a radial direction of the bead cores are expanded outwardly in a radial direction, whereby the inner edge portions in a radial direction of the carcass positioned at inner sides in a radial direction of the bead core are turned up around the bead cores by the expanding/contracting means.

Accordingly, bead portions having turn-up structure are obtained.

In short, according to the apparatus for manufacturing a green tire of the present invention, a superior effect is obtained in that a pneumatic tire in which the edge portions of the carcass ply are turned up around the bead cores can be easily produced by the core manufacturing method.

In another aspect of the invention, the apparatus for manufacturing a green tire is further characterized in that the expanding/contracting means are toroidal bladders.

Next, an operation of the apparatus for manufacturing a green tire according to this aspect will be described.

In the apparatus for manufacturing a green tire according to this aspect, the bladders are first inserted, in a radially contracted state, at inner sides in a radial direction of the hard core.

When the bead cores are positioned at side surfaces of the carcass, and bladders inserted at inner sides in a radial direction of the bead cores are inflated, the inner edge portions portion in a radial direction of the carcass positioned at inner sides in a radial direction of the bead cores are turned up around the bead cores by the inflated bladder.

In another aspect of the invention, the apparatus for manufacturing a green tire is further characterized in that engaging members, which are engageable with inner edge portions in a radial direction of the carcass, are provided at outer sides in an axial direction of the bladders.

Next, an operation of the apparatus for manufacturing a green tire according to this aspect will be described.

When the carcass is formed by the tire manufacturing method according to another aspect of the invention, turn-up portions of the cord protruded inward in a radial direction from inner edge portions of the hard core are engageable with the engaging members and the turn-up portions can be provided in a proper shape (in a well-aligned manner).

Another aspect of the invention is the apparatus for manufacturing a green tire, further characterized in that carcass-engaging portions, which, in a contracted state of the bladders, are engageable with inner edge portions in a radial direction of the carcass, are formed integrally with outer surfaces in an axial direction of the bladders.

Next, an operation of the apparatus for manufacturing a green tire according to this aspect will be described.

When the carcass is formed by the tire manufacturing method according to another aspect of the invention, turn-up portions of the cord protruded inward in a radial direction from inner ends of the hard core are engageable with the engaging members, and turn-up portions can be provided in a proper shape (in a well-aligned manner).

In another aspect of the invention, is the apparatus for manufacturing a green tire further comprises pressing means for pressing the bladders, when they are inflated, toward the hard core, and press-contacting turn-up portion of the carcass with a main body.

Next, an operation of the apparatus for manufacturing a green tire according to this aspect will be described.

Since there may be cases in which the pressing force resulting merely from inflation of the bladder is insufficient for press-contacting the turn-up portion with the main body, in such cases, the pressing means are used to facilitate pressing the inflated bladders toward the hard core so that the turn-up portion of the carcass can be press-contacted with the hard core.

In another aspect of the invention, the apparatus for manufacturing a green tire is further characterized in that the expanding/contracting means comprises arm portions which can be inserted at inner sides of the hard core and rollers which are provided at one end of the arm portions, and the driving means for moving the arm portions in an axial direction and in a radial direction of the hard core.

Next, an operation of the apparatus for manufacturing a green tire according to this aspect will be described.

When the carcass is to be turned up, the rollers are first inserted to the hard core at inner sides in a radial direction of the hard core before the carcass is formed.

After the carcass has been formed and the bead cores have been positioned, when the rollers are moved outwardly in an axial direction of the bead cores, and also outwardly in a radial direction of the hard core, the inner edge portions in a radial direction of the carcass, positioned at inner sides in a radial direction of the bead cores are turned up around the bead cores by the rollers.

BEST MODE FOR CARRYING OUT THE INVENTION

First Embodiment

With reference to the drawings, a detailed description of a first embodiment of the present invention will be made, hereinafter.

Figure 1:
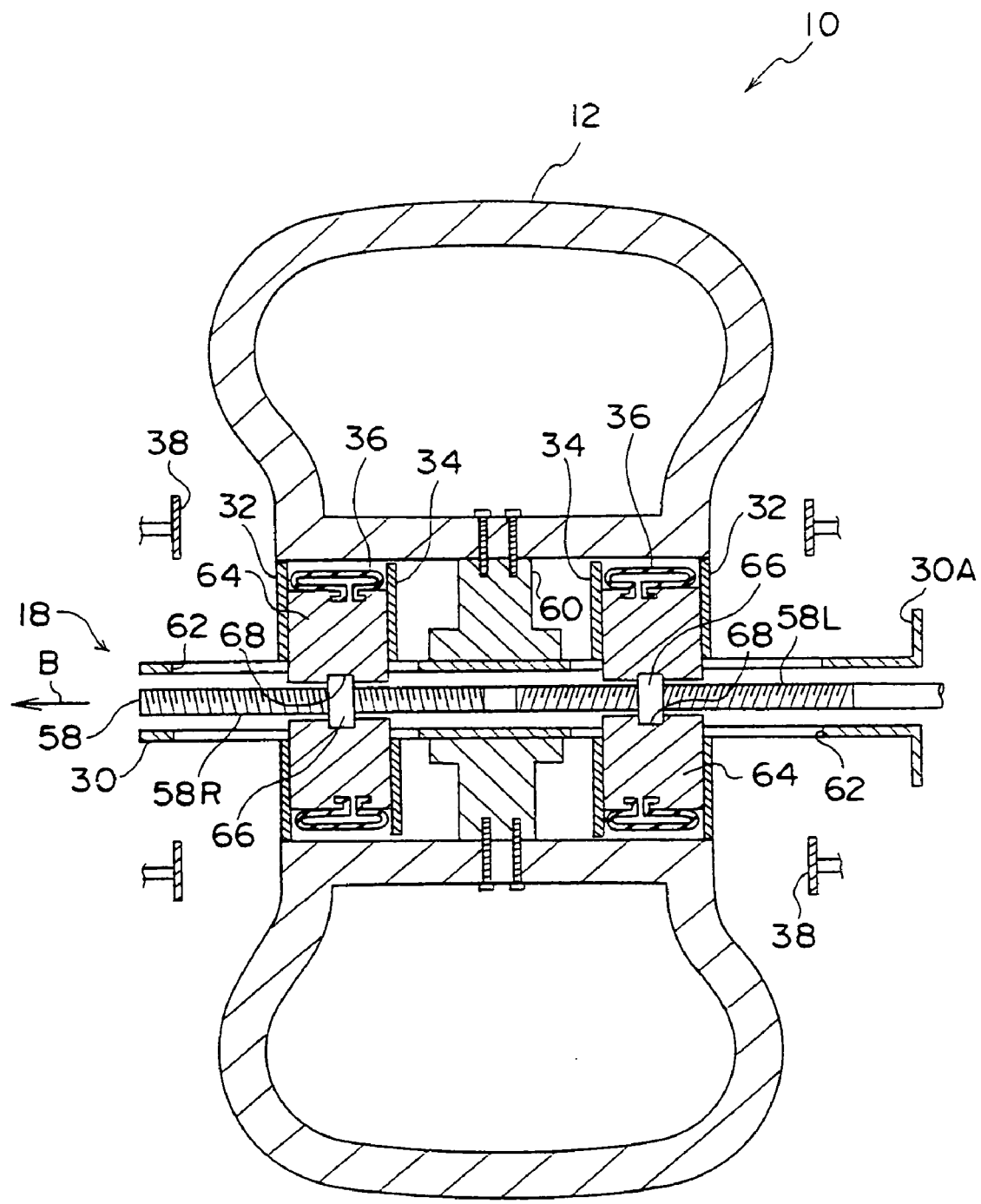
FIG. 1 is a cross-sectional view of an apparatus for manufacturing a green tire according to a first embodiment of the present invention.
Figure 2:
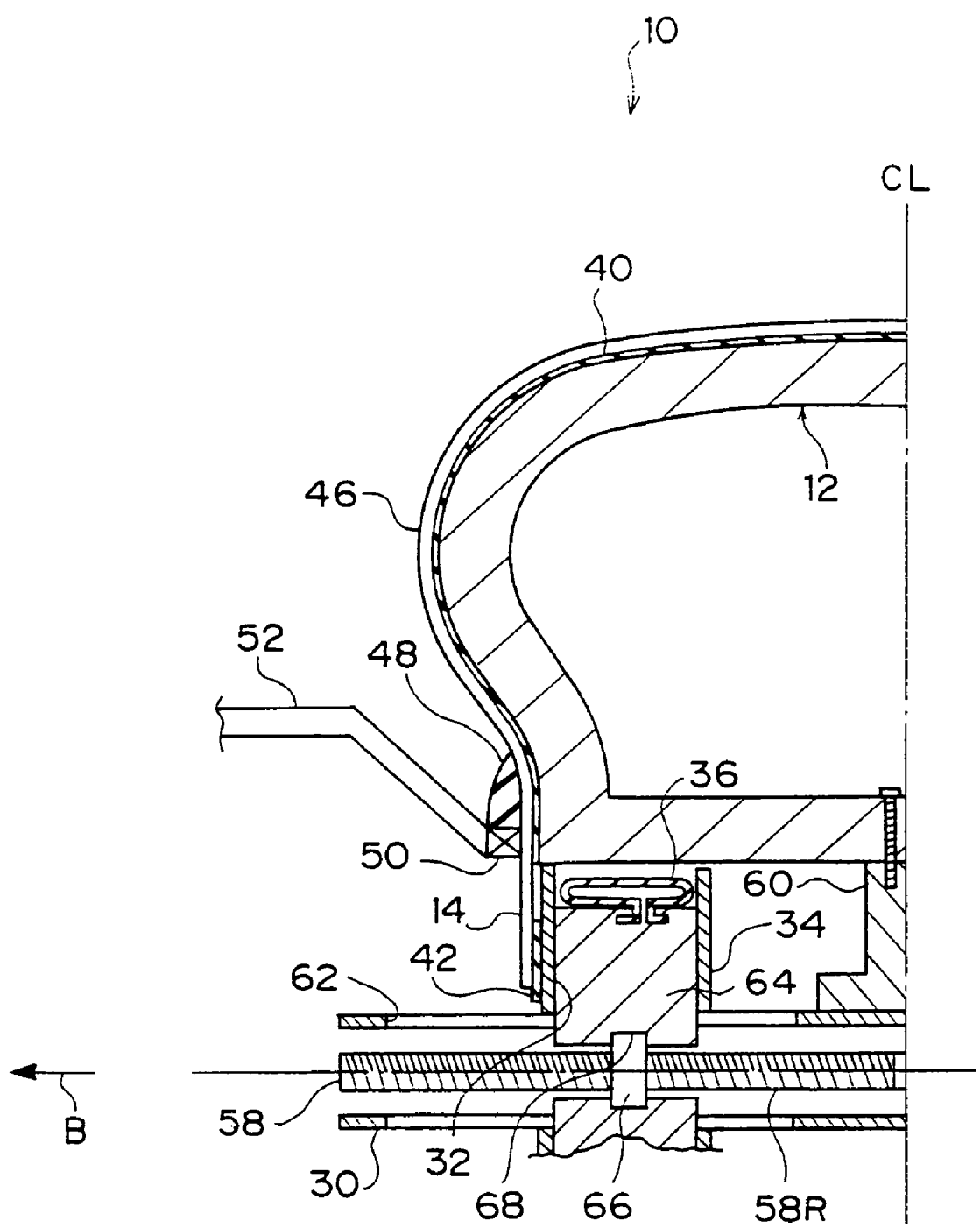
FIG. 2 is a cross-sectional view of the apparatus for manufacturing a green tire, illustrating a state in which bead cores have been set at a carcass.
Figure 3:
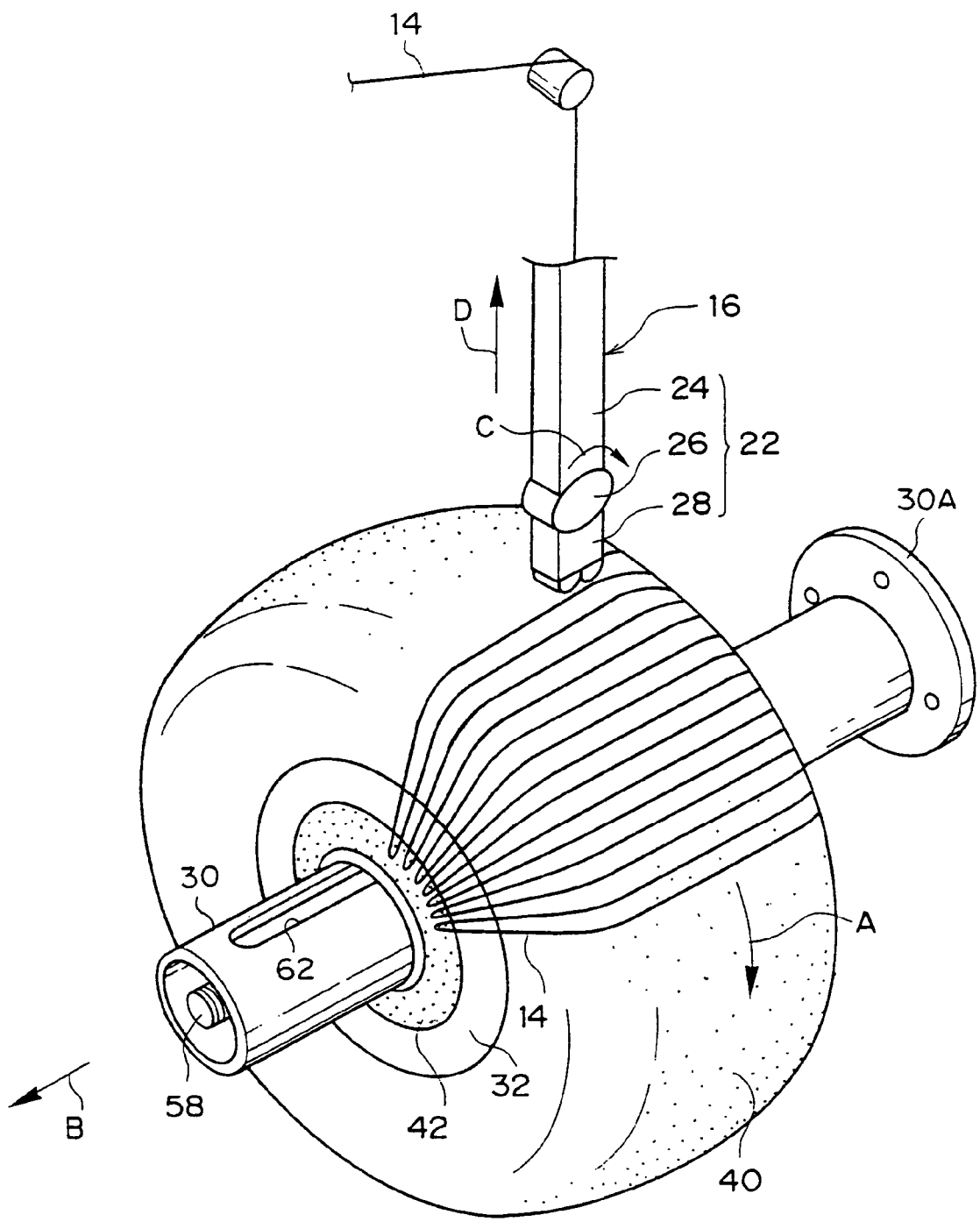
FIG. 3 is a perspective view of a tire, illustrating a state in which a steel cord is being set onto an inner liner.

As shown in FIGS. 1 to 3, an apparatus 10 for manufacturing a green tire comprises a toroidal hard core 12, a setting mechanism 16 for setting a rubber-coated steel cord 14, a turn-up mechanism 18 for turning up a carcass, a pressing mechanism 20, and a bead holding arm 52.

The setting mechanism 16 comprises an unillustrated feeding portion for stocking therein the rubber-coated steel cord 14 and a setting portion 22 for setting the steel cord 14.

The setting portion 22 comprises an arm 24 through an inner portion of which the steel cord 14 is passed, and a swing portion 28 which is structured to be able to rotate around a rotational axis 26 disposed at a tip end of the arm 24 and feed the steel cord 14.

The turn-up mechanism 18 comprises a cylindrical main shaft external cylinder 30 disposed at the shaft of the hard core 12, and a main shaft central axis 58 disposed inside the main shaft external cylinder 30 coaxially therewith.

A flange 60 is fixed integrally to an inner circumferential surface of the hard core 12 at a central portion in an axial direction thereof.

The main shaft external cylinder 30 is passed through the flange 60 and fixed thereto.

A flange 30A is formed at one end of the main shaft external cylinder 30, and a pair of elongated holes 62, which extend in an axial direction of the main shaft external cylinder 30, is respectively formed in the main shaft external cylinder 30 at each side of the flange 60.

The flange 30A of the main-shaft external cylinder 30 is connected to an unillustrated rotational driving apparatus, and is capable of being rotated.

Tops 64 are respectively disposed at each side of the flange 60, and portions of tops 64 are inserted, through the elongated holes 62, into the main shaft external cylinder 30.

The main shaft central axis 58 has a left-handed screw 58L formed at a side of the flange 30A of the main shaft external cylinder 30, and a right-handed screw 58R formed at an opposite side thereof. The main shaft central axis 58 is connected to an unillustrated rotational driving apparatus, and is able to rotate independently of the main shaft external cylinder 30.

Nuts 66 are respectively threadably mounted to the left-handed screw 58L and the right-handed screw 58R of the main shaft central axis 58.

Grooves 68 are formed at an inner circumferential surface side of the tops 64, and the nuts 66 are fitted into the grooves 68.

Therefore, by rotating the main shaft central axis 58, one top 64 and the other top 64 can be moved toward or away from each other, with the flange 60 interposed therebetween.

Toroidal plates 34 are mounted at a side surface of each top 64, which side surface is at the side of the flange 60, and toroidal engaging plates 32 are mounted at another side surface of each top 64, which another side surface is opposite to the flange 60.

Toroidal bladders 36, which are expandable/contractible, are disposed at outer circumferential surface sides of the tops 64 between the engaging plates 32 and the plates 34.

Further, when the bladders 36 are contracted, the outer circumferential surfaces of the bladders 36 are positioned at relatively inner side in a radial direction with respect to the outer circumferential portions of the engaging plates 32 and the plates 34.

The pressing mechanism 20 comprises toroidal pressing plates 38 having a diameter larger than those of the engaging plates 32 and the plates 34.

The pressing plates 38 are movable in an axial direction by an unillustrated hydraulic cylinder or the like.

(Operation)

Next, a process for manufacturing a pneumatic tire will be explained.

Firstly, in the first step, an unvulcanized inner liner 40 in sheet form is set onto an external surface of the hard core 12.

Further, before setting the inner liner 40, the bladders 36 are contracted, and the tops 64 are moved together and inserted into the hard core 12.

Further, the external surfaces of the engaging plates 32 are aligned with inner edges in a radial direction of the side surfaces of the hard core 12, and unvulcanized thin rubber sheets 42 are set onto the external surfaces of the engaging plates 32.

In the next step, the rubber-coated steel cord 14 is set on the inner liner 40 by using the setting mechanism 16 (see FIG. 3).

Here, as shown in FIG. 3, the hard core 12, the main shaft external cylinder 30, and the main shaft central axis 58 are, in an integrated state, rotated by the unillustrated rotational driving mechanism in the direction of arrow A. Concurrently, the arm 24 of the setting mechanism 16 moves in a core axis direction (the direction of arrow B and the direction opposite to the direction of arrow B), expanding/contracting vertically (the direction of arrow D, and the direction opposite to the direction of arrow D), and the cord feeding portion 28 rotates around the rotational axis 26 (the direction of arrow C, and the direction opposite to the direction of arrow C).

Then, by the movement of the arm 24 in a core widthwise direction and rotation of the cord feeding portion 28, the steel cord 14 is set in sequence beginning from the rubber sheet 42 and a side surface portion at one side of the hard core 12. When the steel cord 14 reaches the rubber sheet 42 at other side by crossing the outer circumferential surface portion and a side surface portion at the other side of the hard core 12, the arm 24 is expanded/contracted and the cord feeding portion 28 is rotated in an inverse direction and the steel cord 14 is set toward the side surface portion and the rubber sheet portion 42 at the one side of the hard core 12 again.

Namely, the steel cord 14 is turned back at the external surfaces of the rubber sheets 42 and engaged therewith.

Here, the rotational speed of the cord feeding portion 28 and the rotational speed of the hard core 12 are controlled, and the steel cord 14 is set at an outer circumferential portion of the hard core 12 so as to form substantially a right angle with respect to a core circumferential direction.

On the other hand, the steel cord 14 is set substantially along a radial direction of the hard core 12 at the side surface portion at one side, and at the side surface portion at the other side, of the hard core 12.

In this way, the steel cord 14 is set on the inner liner 40 sequentially in a circumferential direction, and the steel cord 14 makes at least one round on the inner liner 40, whereby a carcass 46 is formed.

Figure 4:
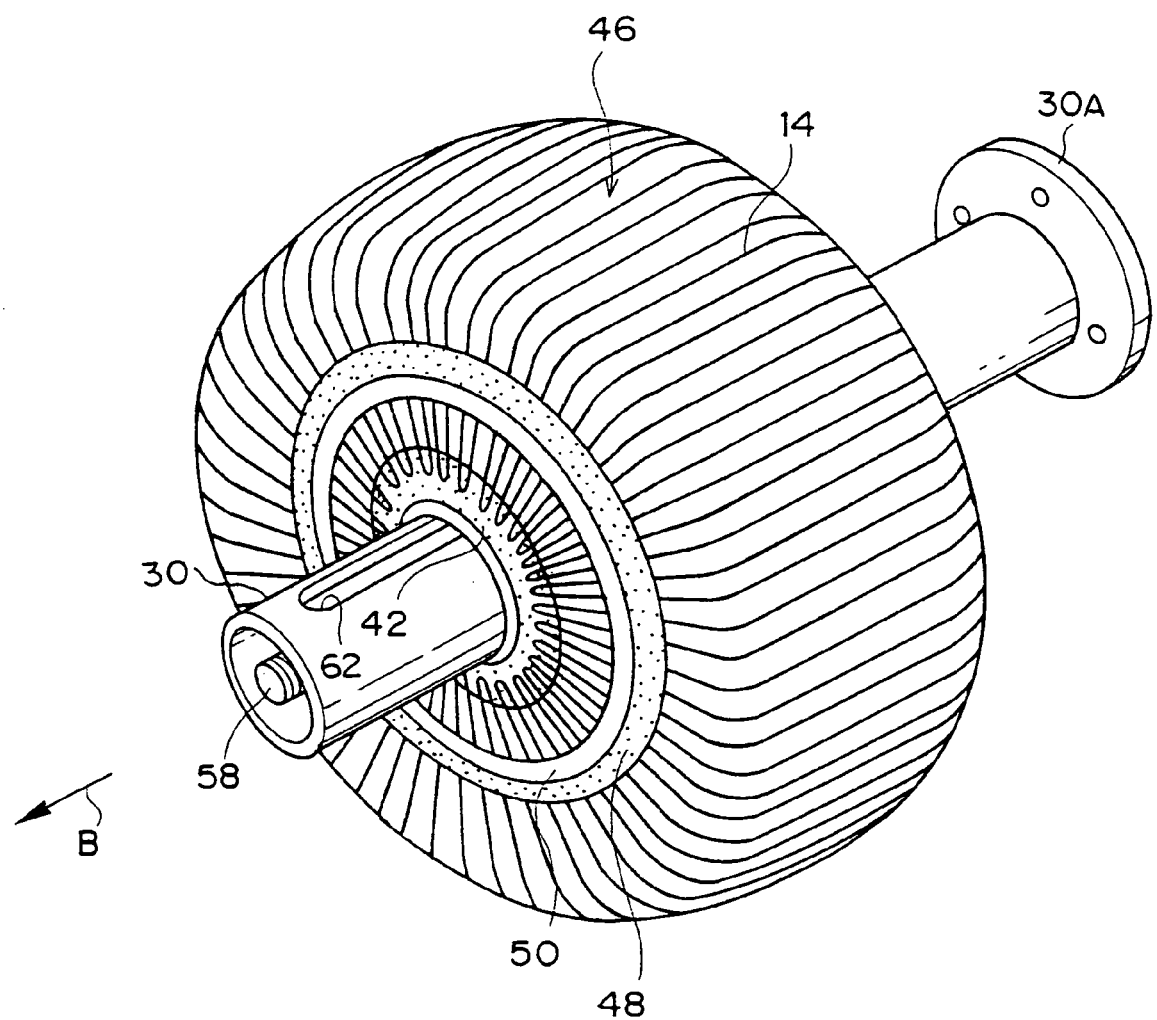
FIG. 4 is a perspective view of the apparatus for manufacturing a green tire, illustrating a state in which a bead core has been set at a carcass.

In the next step, as shown in FIGS. 2 and 4, a ring-shaped bead core 50, to which a bead filler 48 is mounted, is press-contacted with a side surface of the carcass 46 by the bead holding arm 52.

Figure 5:
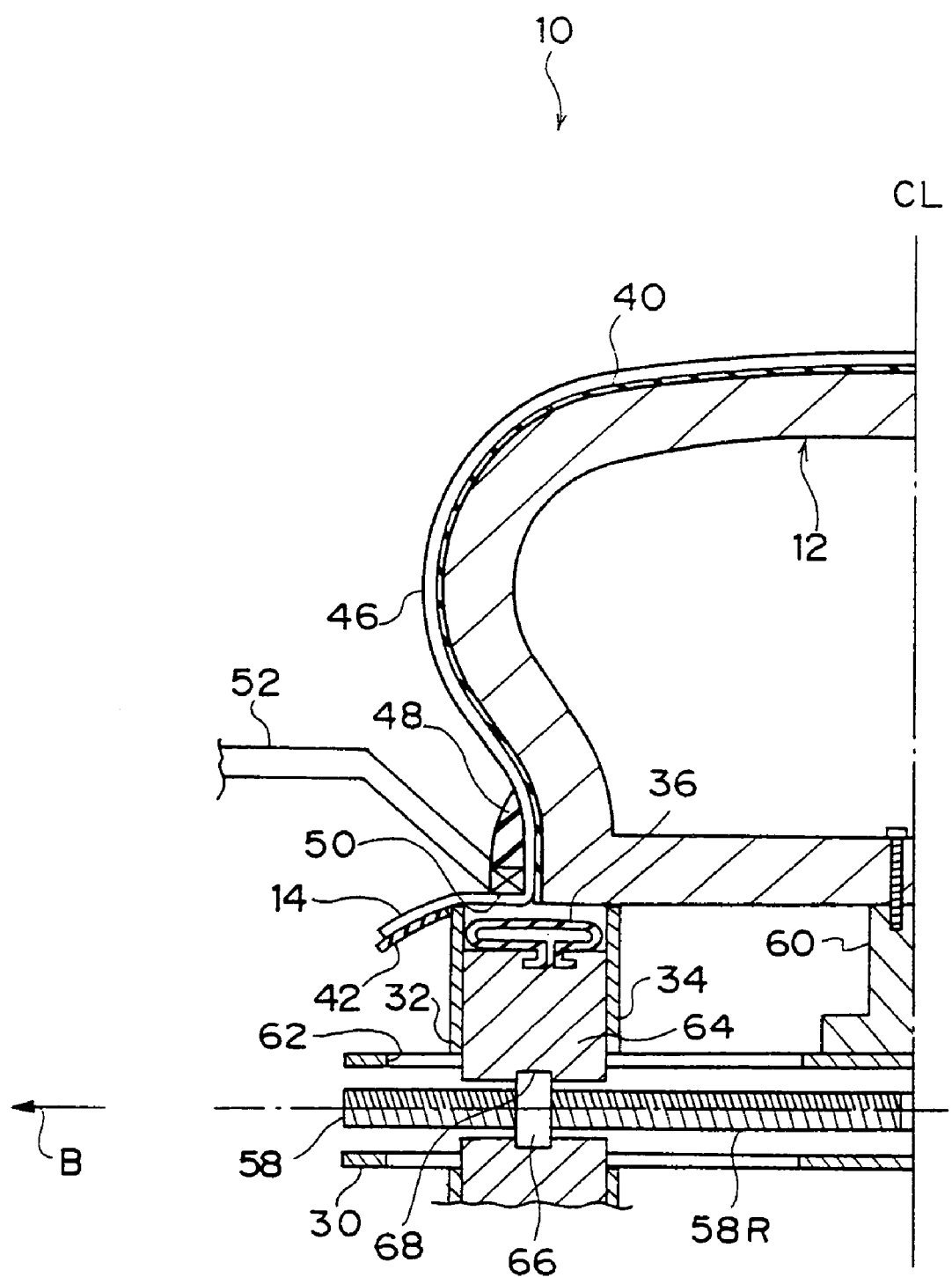
FIG. 5 is a cross-sectional view of the apparatus for manufacturing a green tire, illustrating a state during turn-up of an inner edge portion of a carcass.

In the next step, the main shaft central axis 58 is rotated, as shown in FIG. 5, moving the bladder 36 slightly outward in an axial direction of the hard core 12, and disposing the bladder 36 at an inner side in a radial direction of the bead core 50. Accordingly, an inner end portion of the carcass 46 is drawn outward in an axial directional of the bead core 50 through the inside of the bead core 50.

Figure 6:
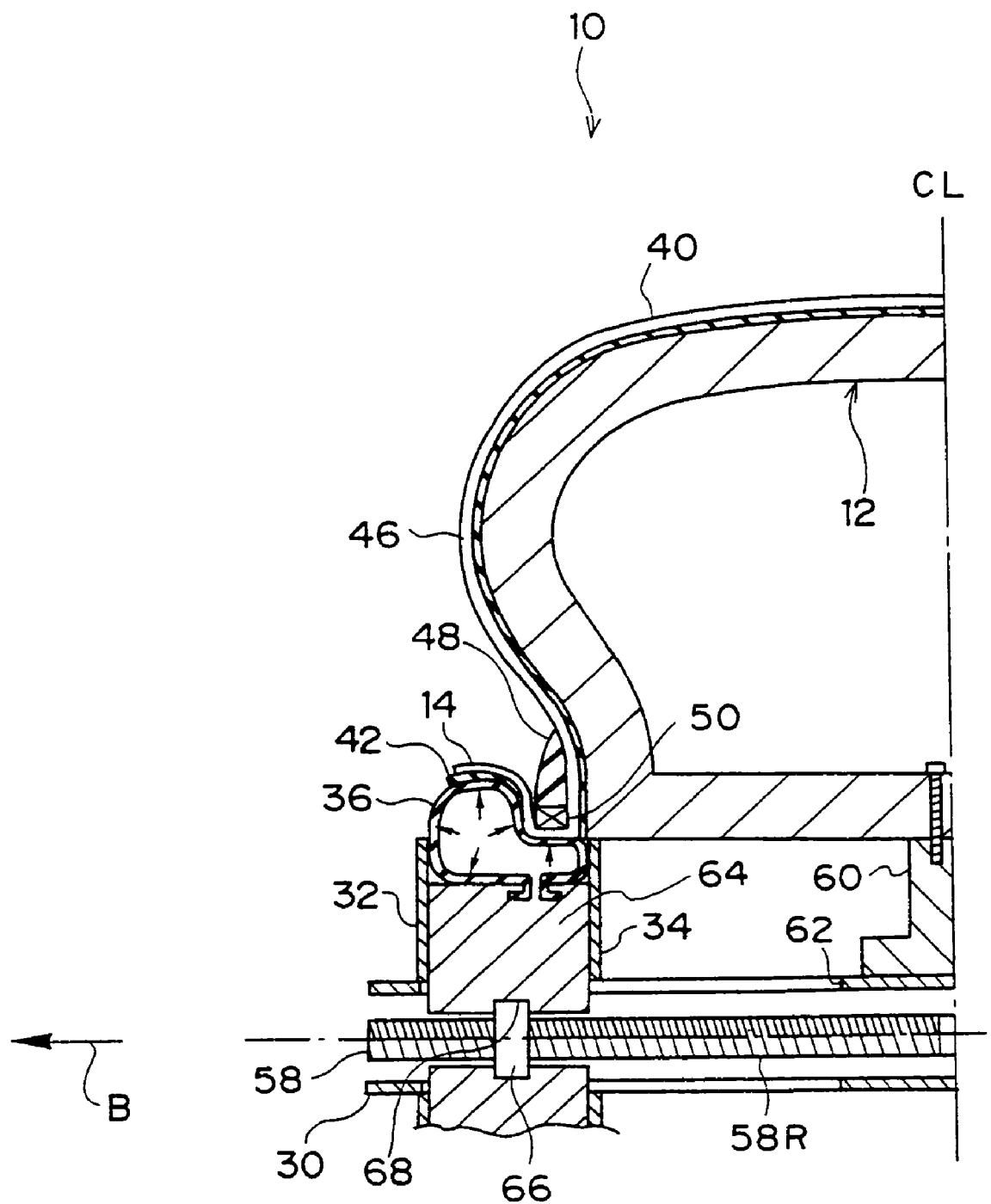
FIG. 6 is a cross-sectional view of the apparatus for manufacturing a green tire, illustrating a state in which the carcass is turned up due to inflation of a bladder.

In the next step, as shown in FIG. 6, the bladder 36 is inflated, and the bead holding arm 52 (not shown in FIG. 6) is withdrawn from the bead core 50. Due to the inflation of the bladder 36, the carcass 46 drawn outward in the axial direction of the bead core 50 is turned up outwardly in a radial direction, and the bead core 50 is held by the bladder 36 from inside the bead core 50.

Figure 7:
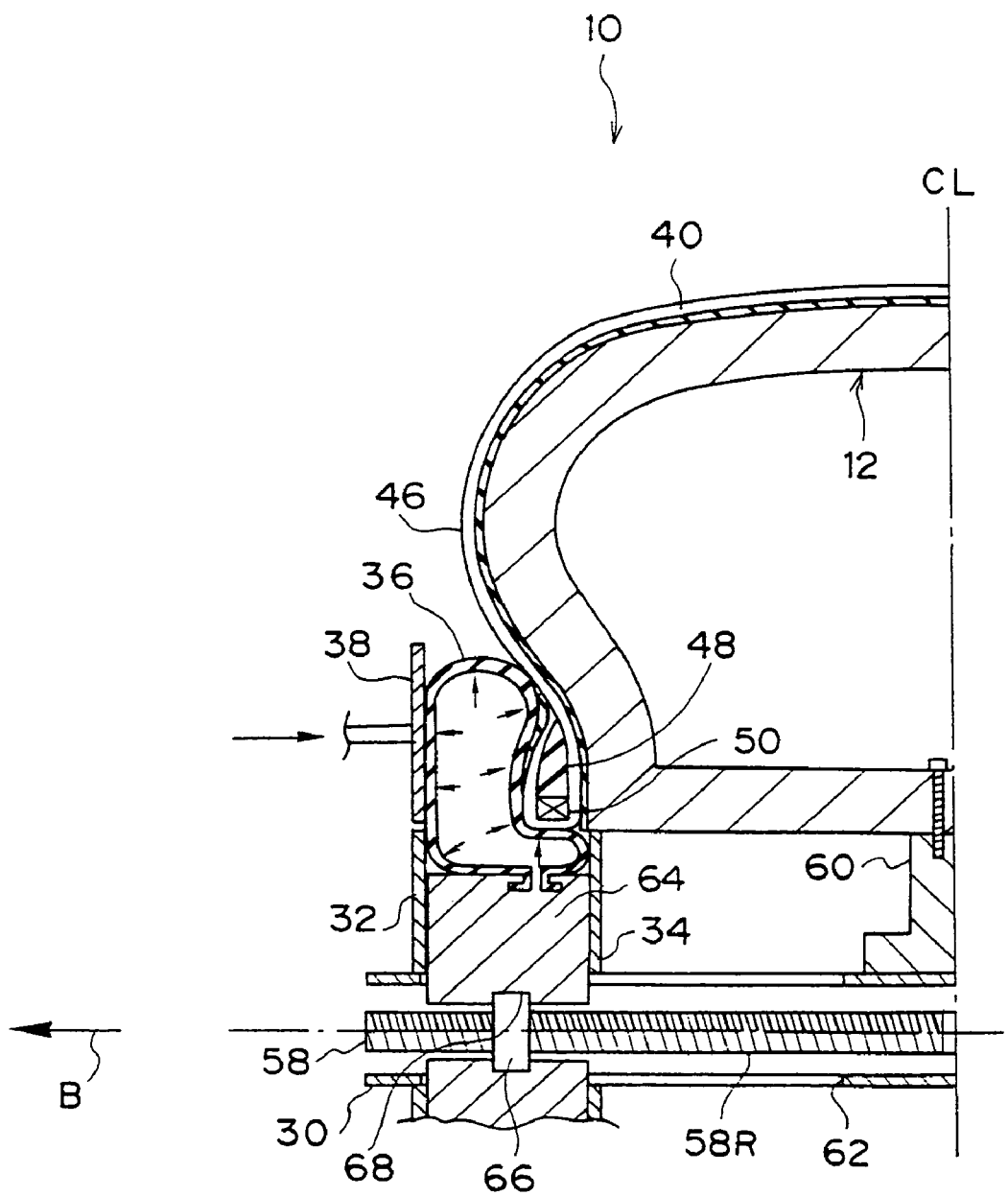
FIG. 7 is a cross-sectional view of the apparatus for manufacturing a green tire, illustrating a state in which pressure is applied to a turned up portion of the carcass.

In the next step, as shown in FIG. 7, the bladder 36 is further inflated, and the inflated bladder 36 is pressed toward the hard core 12 by the pressure plate 38.

By this, the turned-up portion of the carcass 46 is held fast to the bead core 50, the bead filler 48, and the main body portion of the carcass 46.

Further, after the carcass 46 has been thus formed, conventionally known tire structural members (not shown) such as a belt, a side tread and a top tread are set thereon, and manufacturing of a green tire on the external surface of the hard core 12 is thereby completed.

After the green tire is completed, the main shaft central axis 58 is rotated to move the tops 64 outward from the hard core 12, and tops 64, engaging plate 32, and plate 34 on the opposite side to the flange 30A of the main shaft external cylinder 30 are disengaged. Next, the flange 60 is disengaged from the main shaft external cylinder 30, and the green tire and the hard core 12, having the flange 60 mounted thereto, are moved in the direction of arrow B and detached from the main shaft external cylinder 30, whereafter, the green tire and the hard core 12 are loaded in a mold (not shown) and vulcanized. After vulcanization, the hard core 12 is disassembled and removed from the inside of a product tire.

According to the tire manufacturing method of the present embodiment, even in the core manufacturing method, the carcass 46 can be easily turned up around the bead core 50 and it is possible to manufacture a pneumatic tire having high transverse rigidity in which tuning utilizing the turn-up structure can be carried out.

Second Embodiment

Next, a second embodiment of a tire manufacturing method of the present invention will be described. Further, structures identical to those in the first embodiment are denoted by the same reference numerals and descriptions thereof are omitted.

Figure 8:
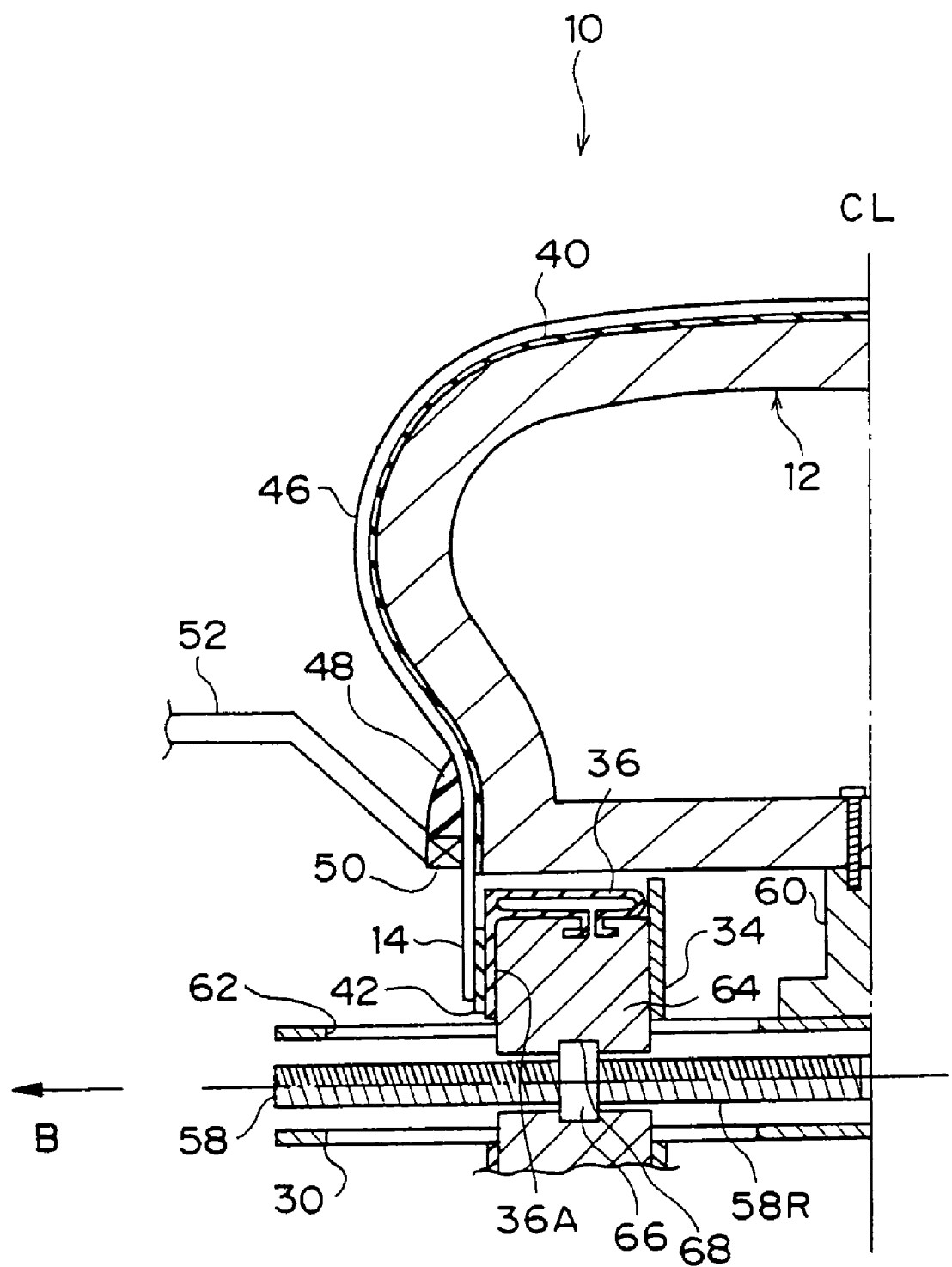
FIG. 8 is a cross-sectional view of an apparatus for manufacturing a green tire according to a second embodiment of the present invention.

As shown in FIG. 8, in the present embodiment, in place of the engaging plate 32, a carcass engaging portion 36A is formed integrally with a side surface of the bladder 36, and the rubber sheet 42 is set onto the carcass engaging portion 36A to turn up the steel cord 14.

Figure 9:
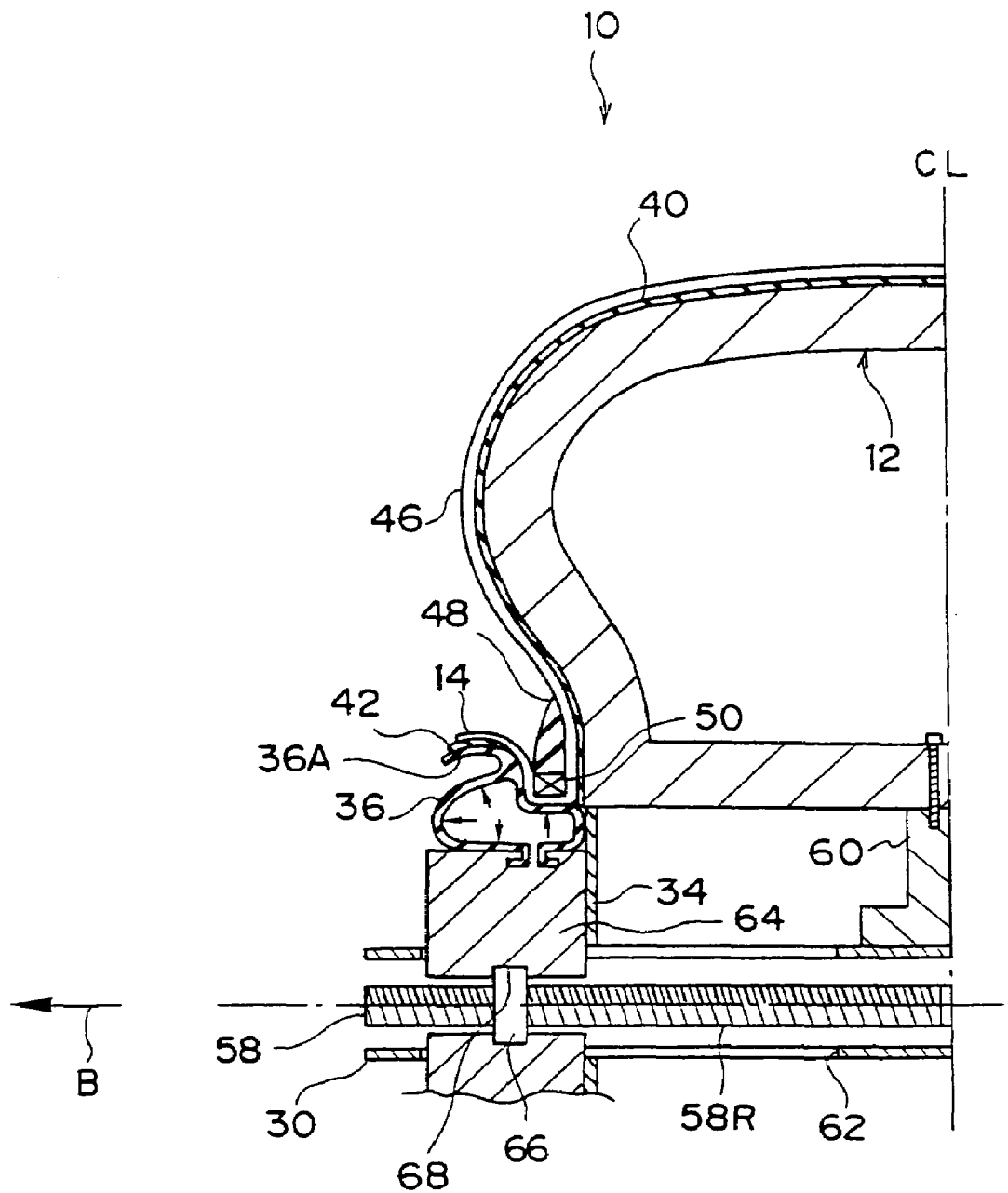
FIG. 9 is a cross-sectional view of the apparatus for manufacturing a green tire, illustrating a state during turn-up of each inner edge portion of a carcass.

When the bladder 36 is inflated, the steel cord 14 is turned up with a portion of the carcass engaging portion 36A, as shown in FIG. 9.

Thereafter, a green tire is formed in the same manner as in the first embodiment of the present invention.

Figure 10A:
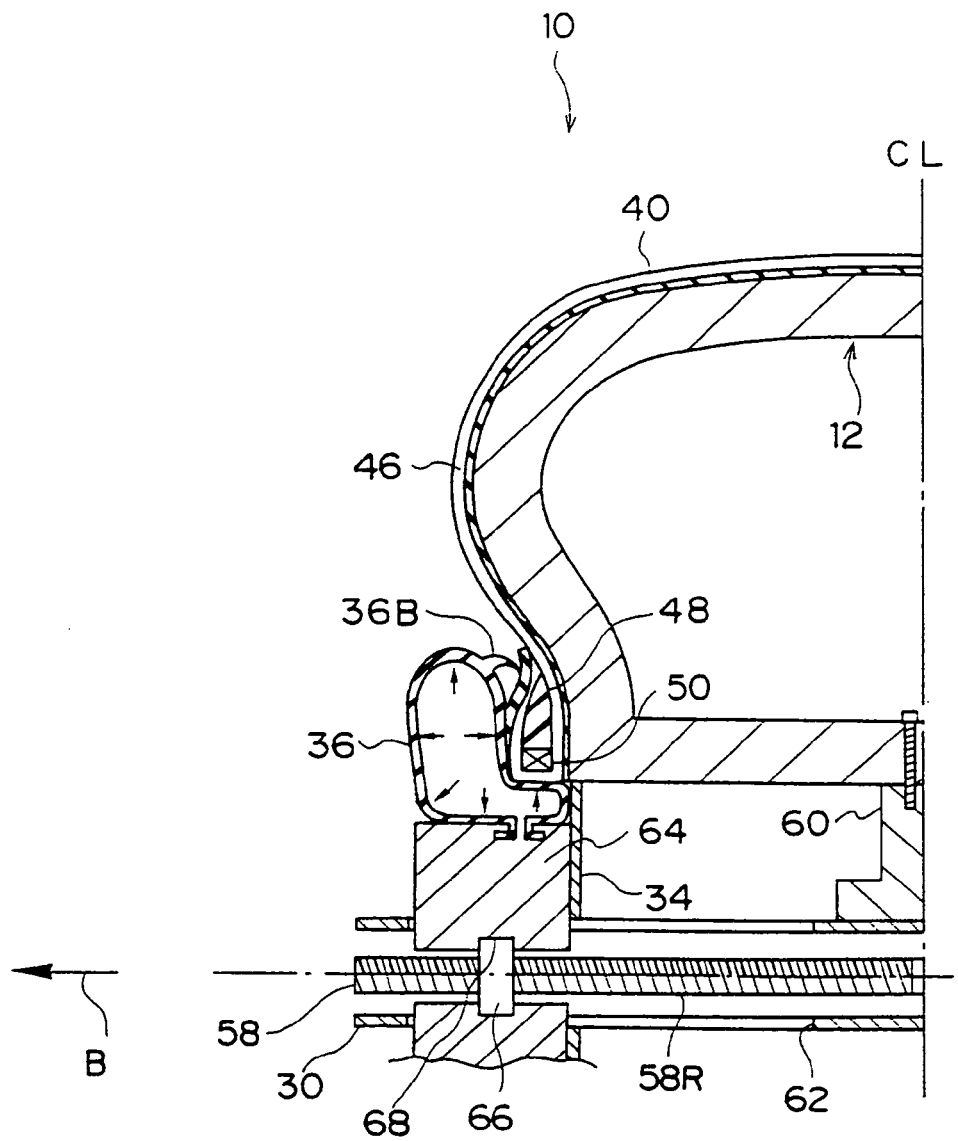
FIG. 10A is a cross-sectional view of the apparatus for manufacturing a green tire, illustrating a modified example of a bladder.
Figure 10B:
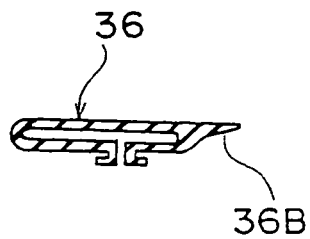
FIG. 10B is a cross-sectional view of the bladder before inflation.

Further, a modified example of the bladder 36 is shown in FIG. 10A. For the bladder 36 shown in FIG. 10A, a carcass pressing portion 36B is formed integrally therewith, which, during inflation (shown by a two-dot chain line), contact against a turn-up portion of the carcass 46, with the tip end thereof bent from the bladder main body toward an inner side in a radial direction of the core. The carcass pressing portion 36B can press the turn-up portion of the carcass 46 toward the main body.

Third Embodiment

Next, a third embodiment of a tire manufacturing method of the present invention will be explained. Further, structures identical to those in the first embodiment are denoted by the same reference numerals, and descriptions thereof are omitted.

The present embodiment is a tire manufacturing method in which the steel cord 14 is turned up without using the bladders 36.

Figure 11:
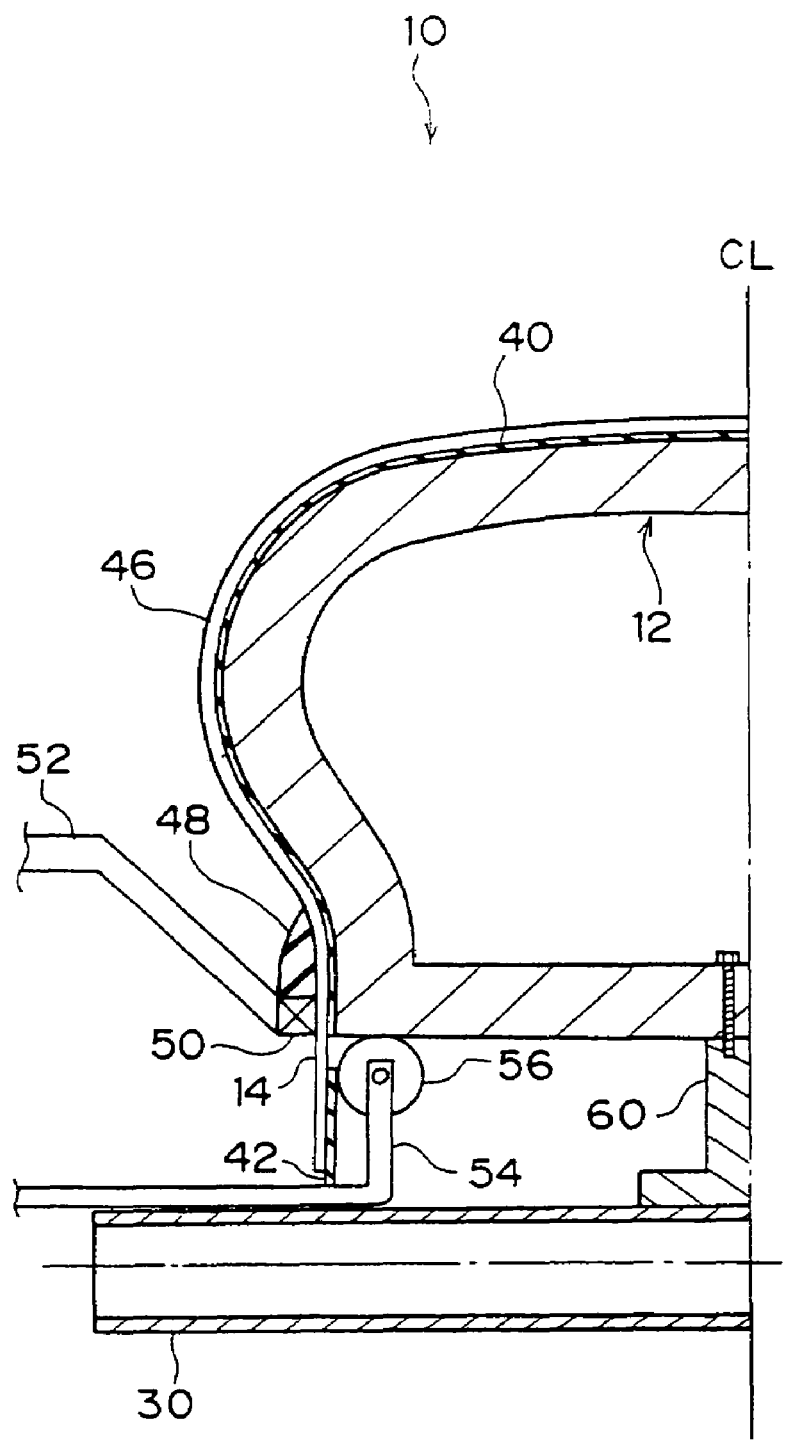
FIG. 11 is a cross-sectional view of an apparatus for manufacturing a green tire according to a third embodiment of the present invention.

As shown in FIG. 11, the turn-up mechanism 18 of the present embodiment comprises an L-shaped arm 54 that can be inserted into the hard core 12.

Further, although only a single arm 54 is shown in FIG. 11, in fact, a plurality of arms 54 is provided along a circumferential direction of the hard core 12 at a predetermined interval.

A roller 56 is supported at a tip end of each arm 54 so as to be able to rotate freely.

In the present embodiment, firstly, as shown in FIG. 11, the roller 56 is disposed in the vicinities of inner edge portions of the hard core 12, and the rubber sheet 42 is set thereon. Then, the carcass 46 is formed in the same manner as in the above-described embodiments, and the bead core 50 is placed at a side surface thereof.

Figure 12:
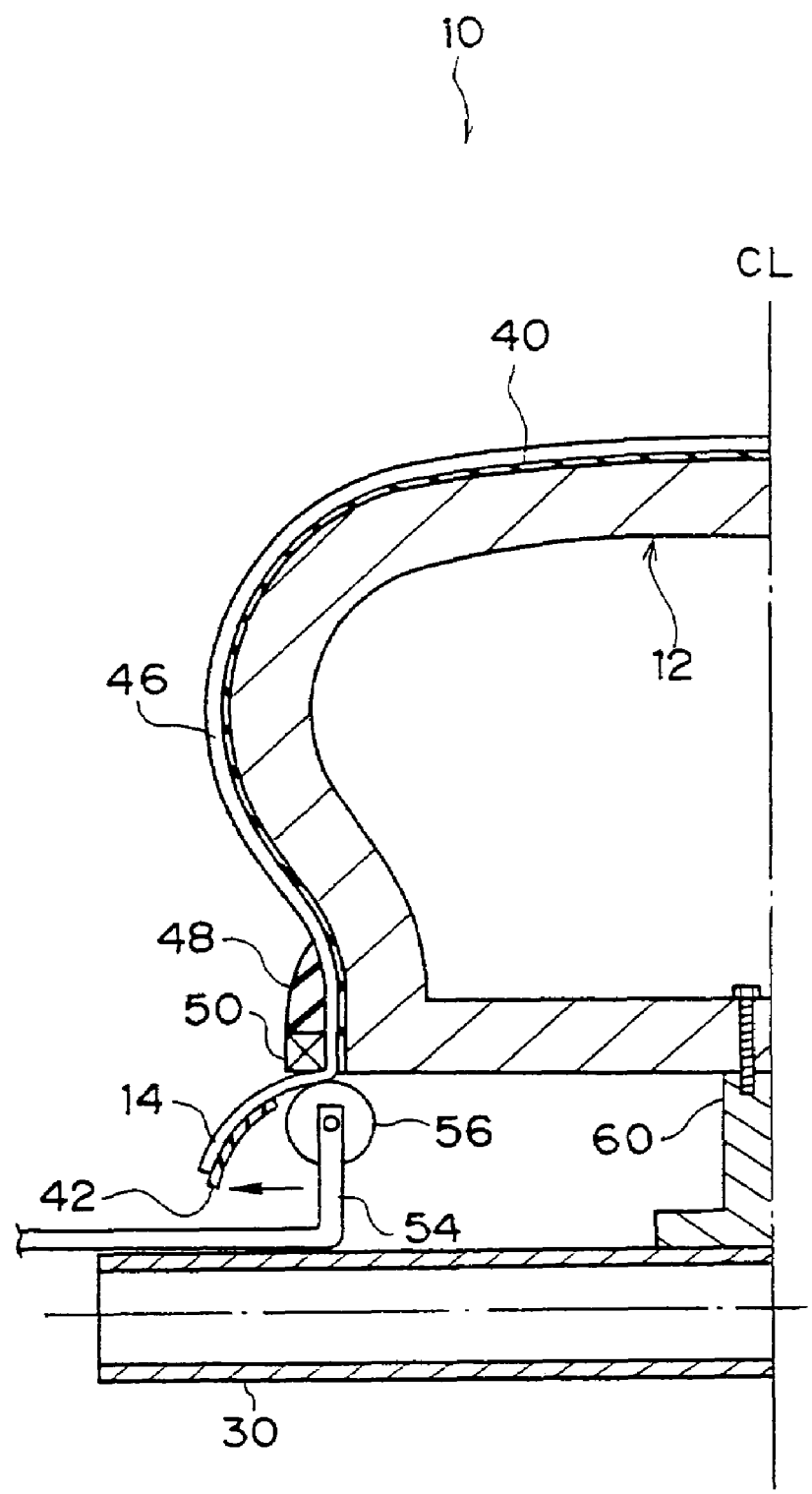
FIG. 12 is a cross-sectional view of the apparatus for manufacturing a green tire, illustrating a state in which a carcass is being bent due to movement of a roller.

Next, as shown in FIG. 12, when the roller 56 is moved outward in an axial direction of the hard core, an inner edge portion of the carcass 46 is drawn through the inside of the bead core 50, and drawn outward in an axial direction of the bead core 50.

Figure 13:
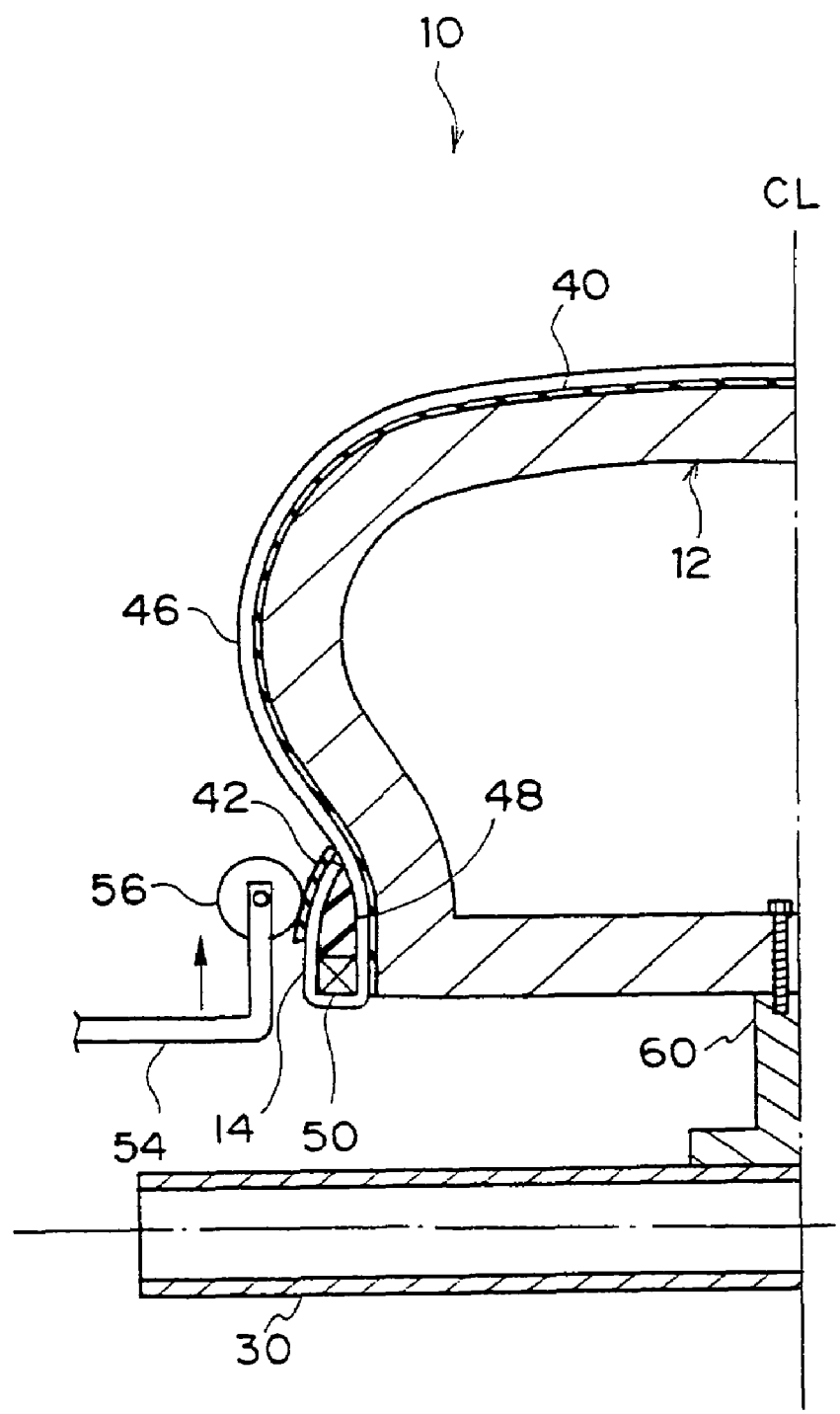
FIG. 13 is a cross sectional view of the apparatus for manufacturing a green tire, illustrating a state in which the carcass is being turned up due to inflation of a bladder.
Figure 14:
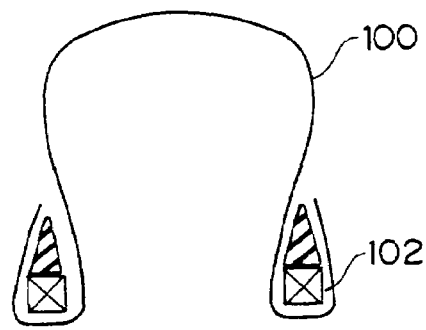
FIG. 14 is a schematic cross-sectional view of a carcass and a bead core illustrating a turn-up structure.
Figure 15:
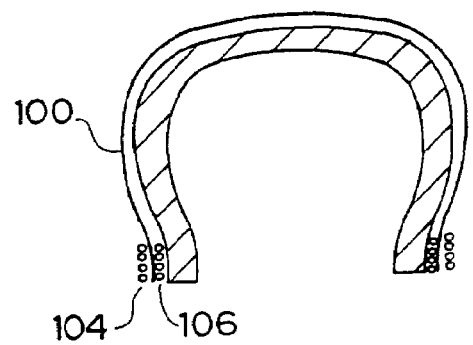
FIG. 15 is a cross-sectional view of a carcass and a bead core according to one example of the conventional core manufacturing method.
Figure 16:
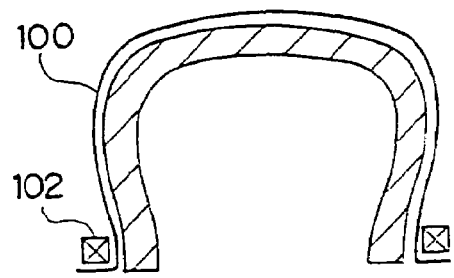
FIG. 16 is a cross-sectional view of a carcass and a bead core according to another example of the conventional core manufacturing method.

In the next step, as shown in FIG. 13, the roller 56 is moved further outward in an axial direction of the hard core 12 and thereafter, moved outward in a radial direction of the core. Accordingly, the carcass 46 is turned up outwardly in a radial direction.

Thereafter, a green tire is formed by the same process as in the first embodiment.

INDUSTRIAL APPLICABILITY

As described above, a tire manufacturing method and an apparatus for manufacturing a green tire according to the present invention are suitably used for manufacturing a pneumatic tire for a vehicle.

What is claimed is:

1. A method of manufacturing a tire, comprising:
providing an unvulcanized thin rubber sheet member in a radial direction at each side of a toroidal hard core;
forming a carcass along an outer circumference of the toroidal hard core;
turning up integrally with the sheet member, around bead cores, inner edge portions in a radial direction of the carcass formed on an outer surface of the hard core, by expanding outwardly in a radial direction expanding/contracting means inserted at an inner side in a radial direction of the bead cores and/or the hard core, to form a green tire; and
loading the green tire into a mold and vulcanizing the green tire to obtain a pneumatic tire.

2. The method of manufacturing a tire according to claim 1, wherein the step of forming the carcass comprises:
setting an unvulcanized rubber-coated cord on the hard core from one side surface portion to the other side surface portion of the hard core,
turning the cord back at the other side surface,
setting the cord on the hard core from the other side surface portion toward the one side surface portion and turning the cord back again, and
setting the cord sequentially along a core circumferential direction.

3. A combination of tire components and an apparatus for manufacturing a green tire, comprising:
a toroidal hard core;
an unvulcanized thin rubber sheet member provided in a radial direction at each side of the toroidal hard core;
a carcass formed along an outer circumference of the toroidal hard core;
bead cores;
expanding/contracting means which can be inserted at an inner side in a radial direction of the bead cores and/or the hard core, which expand and/or contract in a radial direction; and
moving means for moving the expanding/contracting means in an internal direction or an external direction with respect to the hard core to turn up integrally with the sheet member, around the bead cores, inner edge portions in a radial direction of the carcass formed on an outer surface of the hard core.

4. The combination for manufacturing a green tire according to claim 3, wherein the expanding/contracting means are toroidal bladders.

5. The combination for manufacturing a green tire according to claim 4, wherein engaging members, which are engageable with inner edge portions in a radial direction of the carcass, are provided at outer sides in an axial direction of the bladders.

6. The combination for manufacturing a green tire according to claim 4, wherein carcass-engaging portions, which, in a contracted state of the bladders, are engageable with inner edge portions in a radial direction of the carcass, are formed integrally with outer surfaces in an axial direction of the bladders.

7. The combination for manufacturing a green tire according to claim 4, further comprising pressing means for pressing the bladders, when they are inflated, toward the hard core, and press-contacting turn-up portion of the carcass with a main body.

8. The combination for manufacturing a green tire according to claim 3, wherein the expanding/contracting means comprises arm portions which can be inserted at inner sides of the hard core and rollers which are provided at one end of the arm portions, and
wherein the moving means comprises driving means for moving the arm portions in an axial direction and in a radial direction of the hard core.

9. The combination for manufacturing a green tire according to claim 5, further comprising pressing means for pressing the bladders, when they are inflated, toward the hard core, and press-contacting turn-up portion of the carcass with a main body.

10. The combination for manufacturing a green tire according to claim 6, further comprising pressing means for pressing the bladders, when they are inflated, toward the hard core, and press-contacting turn-up portion of the carcass with a main body.

11. The combination for manufacturing a green tire according to claim 5, wherein the sheet member is attached to the engaging members.

12. The combination for manufacturing a green tire according to claim 6, wherein the sheet member is attached to the carcass-engaging portions.

* * * * *